United States Patent Office 3,435,898
Patented Apr. 1, 1969

3,435,898
WATER FLOOD METHOD WITH OIL SOLUBLE SURFACTANT
James L. Thompson, Tulsa, Okla., assignor to Sinclair Research, Inc., a corporation of Delaware
No Drawing. Filed May 22, 1967, Ser. No. 640,398
Int. Cl. E21b 43/16, 43/20
U.S. Cl. 166—274     19 Claims

ABSTRACT OF THE DISCLOSURE

A water flood method for the secondary recovery of crude oil from an underground formation containing the same comprising injecting into the formation from an input well area a hydrocarbon solvent containing about 0.001 to 5% of an oil soluble, substantially water insoluble surface active agent selected from the group consisting of alkyl and aralkyl polyoxyethylene phosphate ester and diester acids of the type R—OPO$_3$H$_2$ and (R—O)$_2$PO$_2$H wherein R is an alkyl of about 8 to 27 carbon atoms and alkylphenyl, modified with about 1 to 40 moles ethylene oxide, and the alkaline earth metal or alkali metal salts of such agents, in an amount sufficient to produce a slug thereof in the reservoir, and subsequently injecting into the formation an aqueous medium to drive the hydrocarbon towards an output well, and recovering the crude oil from the output well. The solvent can also be recovered. The solvent can be injected in an amount less than about 0.45% pore volume to improve the water injectivity of the system.

---

Water flooding is widely used in the petroleum industry to effect secondary recovery of oil. The term "water" as herein employed is any water injected into oil-bearing formations for the secondary recovery of oil. In flooding operations, water is forced under pressure through injection wells into or under oil-bearing formations to displace the oil therefrom to adjacent producing wells. The oil-water mixture is usually pumped from the producing wells into a receiving tank where the water, separated from the oil, is siphoned off, and the oil then transferred to storage tanks. In conventional operations, the water employed varies from relatively pure spring water to brine. By employing water flooding, the yield of oil from a given field may be increased beyond the 20–30 percent of the oil in a producing formation that is usually recovered in the primary process. A simple water-flooding technique has, however, been found to leave large amounts, e.g., about 25% of oil behind the displacement front due to capillary effects. These occur not only at the internal surface of the rock matrix, i.e., at the pore walls, but also at the water-oil interfaces. The capillary effects are measured by the surface area per unit bulk volume, by the surface energy per unit surface (interfacial tension), and by the contact angle at the points where both fluid phases are in contact with the solid matrix.

These capillary effects and the oil retention can, as is known, be reduced through the use of a fluid miscible with the oil, e.g., propane, etc., as a displacing agent between the water and the oil to be recovered so that there is no phase separation surface. To be economical, however, the fluid must be recoverable in high yields. If only propane and water are used, oftentimes, the propane cannot be adequately recovered due to the capillary forces between it and the water flood. Accordingly, surface active agents of many types such as the oil-soluble Span and Tween products of Atlas Powder Company have been added to the fluid to reduce the interfacial tensions between the oil and propane. Water-soluble agents have been added to the water. The Span products are sorbitan fatty acid esters, while the Tween products are ethoxylated sorbitan fatty acid esters. The addition of such known surface active agents has not, however, proved practical since, for example, the rock surfaces of the oil bearing formation absorb many of the agents from the water or propane, which decreases their concentrations at the flood front. Since this is the region in which the oil, for example, is being removed, their effect is greatly reduced. The quantity of agent needed to provide the desired result is so great that the process using the same is not practical. Even if absorption on the rock were not a problem, introduction of an agent in the water would not place the agent at the desired interface since a connate water bank, i.e., formation water, is built up in front of the flood water. Propane does not build up a water bank. The connate water bank would keep the agent from reaching even the water-propane interface. Additionally, the surface active agent must also have good surface tension reducing properties as well as low absorption characteristics. In general, therefore, the search for suitable surface active agents has proved to be an empirical one with agents, suitable in most respects, failing to have one or more of the required characteristics.

This invention is directed to new and improved surface active agents for use in the miscible fluid of a water flooding process which have good surface tension reducing properties as well as low absorption characteristics. The surface active agents used in this invention are the generally oil soluble, substantially water insoluble, i.e., solubility less than about 1%, alkyl and aralkyl polyoxyethylene phosphates of the type R—OPO$_3$H$_2$ and (R—O)$_2$PO$_2$H where R is alkyl or aralkyl modified by oxyethylenation in a mole ratio of ethylene oxide to phosphate of about 1:1 to 40:1. The agents can be used in the free acid form or as the alkaline earth metal, alkali metal or ammonium salt. Salts of the type (R—O)$_2$PO$_2$H can be characterized by the formulae:

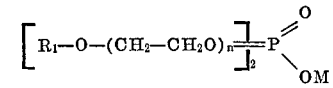

and

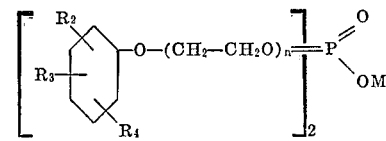

wherein R$_1$ represents an alkyl radical containing from about 8 to 27 carbon atoms, e.g., octyl, nonyl, decyl, hendecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, and heptacosyl radicals, R$_2$ represents an alkyl of about 5 to 27 carbon atoms, e.g., pentyl, heptyl, hexyl, etc., higher alkyls of the same value as R$_1$ cycloalkyl, e.g., cyclopentyl, cyclohexyl, cycloheptyl, cyclooctyl, methylcyclopentyl, methylcyclohexyl, methylcyclooctyl, methylcyclobutyl, 1,1 - dimethylcyclopropyl, ethylcyclopropyl, ethylcyclobutyl, 1 - ethyl-2-methylcyclopropyl, 1,1,2-trimethylcyclopropyl, 1,2,3 - trimethylcyclopropyl, 1,1 - dimethylcyclopentyl, 1,2-dimethylcyclopentyl, 1,3-dimethylcyclopentyl, 1,2-dimethycyclohexyl, 1,3-dimethylcyclohexyl, 1,4-dimethylcyclohexyl, ethylcyclohexyl, ethylmethylcyclopentyl, 1,1,2-trimethylcyclopentyl, cyclononyl, propylcyclohexyl, 1,2,4-trimethylcyclohexyl, 1,3,5-trimethylcyclohexyl, 1-isopropyl-4-methylcyclohexyl, 1,2,4,5-tetramethylcyclohexyl, and "keryl" radicals derived from mineral oils containing alkyl, cycloalkyl and mixed alkylcycloalkyl radicals having from about 12 to 27 carbon atoms, R$_3$ and R$_4$ represent either hydrogen, alkyl of from about 1 to 22 carbon atoms, e.g., methyl ethyl, propyl, butyl, and the higher alkyls defined by $R_1$ and cycloalkyls defined by $R_2$ or "keryl" radicals derived from mineral oils, $n$ represents the degree of oxyethylenation which ranges from about 1 to 40 moles of ethylene oxide per mole of phenolic or straight or branched chain alcohol compounds, and M represents hydrogen, ammonium radical, alkaline earth metal such as barium or alkali metal such as sodium, potassium and lithium; mono, di, and trimethyl ammonium; mono, di, and tri-($\beta$-hydroxyethyl) ammonium; mono, di, and triisopropyl ammonium. The free acids and monoester salts can be characterized by formulae such as the above in which no metal or only one ester group are present. Preferred surface active agents include the aralkyl polyoxyethylene phosphates, particularly as the metal salts and especially the barium salt known as GAF-RM-455, produced by General Aniline Film Corporation.

The new and improved surfactant of this invention is introduced into the miscible fluid in amounts of generally about 0.001 to 5%, preferably about 0.01 to 1% based on the fluid employed, rather than into the flood water to keep the surfactant at, or in front of, the waterflood front where the surfactant can be most effective in reducing the residual miscible fluid saturation.

In the method of this invention, a slug or body of the miscible fluid, i.e., hydrocarbon solvent containing the surfactant, is injected into an oil-bearing underground formation through an input well, or wells, according to conventional flooding techniques to drive the oil in place ahead of it to a producing well, or wells, and a water flood drive is injected behind the solvent slug to drive the slug to the producing well, e.g., until breakthrough of the solvent at the producing well. Various hydrocarbon solvents can be used in this method, including the low molecular weight, generally liquid hydrocarbons, i.e., those boiling below the gasoline range such as the lower alkanes including butane, propane, pentane, hexane and heptane, LPG, natural gasoline, petroleum naphtha, kerosene, and mixtures of these. The solvent should in general have a viscosity up to, i.e., not significantly exceeding, that of the oil in place in the reservoir. Although recovery of the inplace oil may improve with increased viscosity of the hydrocarbon fluid, more of the hydrocarbon fluid is lost since it becomes less water miscible at the same time. The method provides both the high displacement efficiency of a miscible process and the good sweep efficiency of a waterflood.

This invention is additionally directed to a method of improving a water-flood operation by increasing the water injectivity at the input well prior to water injection. Water injectivity is the ability to force water into the formation at the input well. If for example, the injectivity is increased 100%, the time required to complete the flood is shortened by one-half. Although increased injectivity does not necessarily affect the water flood efficiency and the amount of oil recovery may not be improved, the time required for the water-flood operation is substantially reduced. Since the flooding life in a water flood system is usually several years, typically 10 to 15 years, the advantages of improved water injectivity are immediately apparent. The surface active agents of this invention provide greatly improved water injectivity even when very small amounts of miscible fluid are used. The solvent can therefore be used in an amount sufficient to improve water injectivity, usually less than about 0.45% pore volume of the reservoir, preferably about 0.1 to 0.4% pore volume, if desired, although the use of larger amounts, i.e., up to about 50%, particularly 5 to 15 or 25% pore volume, more conventional in a hydrocarbon solvent water flood process can be used and the beneficial results of the new and improved surface active agents obtained therewith. Regardless of the size of the slug, however, increased injectivity and a favorable miscible drive are obtained as long as the slug lasts, this being dependent upon the size of the slug and concentration of the surfactant.

The following examples serve to illustrate the invention.

Example I

Berea sandstone cores were subjected to two control runs and a test run. In preparation for the first control run, the core was cleaned, dried and weighed. The core was then evacuated, saturated under high pressure with 100,000 p.p.m. brine, and weighed again to obtain the pore volume. The pore was brought to irreducible brine saturation by flooding first with mineral oil. Then a heptane flood was conducted until the effluent was 100% heptane, as shown by measurement of the refractive index. A second control run was identical to the control runs except the heptane contained 1 percent by weight of a surfactant identified in Table I.

TABLE I

| Name | Manufacturer | Type |
|---|---|---|
| Triton GR-7 | Rohm & Haas Company. | Sodium dioctyl sulfosuccinate. |
| GAF RM-455 | General Aniline Film Corporation. | Barium salt of an aralkyl phosphate ester. |
| NI-O | California Chemical Company. | Not available. |
| Alkanol OA | E. I. Du Pont de Nemours & Company. | Alkyl polyoxyethylene oxide. |
| Zonyl A | do | Not available. |

Screening tests as summarized in Table II showed that only two surfactants were effective in reducing the water flood residual of heptane: Triton GR-7 and GAF RM-455.

TABLE II

| Run No. | Core No. | Type flood | Surfactant used in test | Heptane [1] saturation, percent PV | |
|---|---|---|---|---|---|
| | | | | Initial | Final |
| 1 | SF-1 | Control | | 75.2 | 21.4 |
| 2 | SF-1 | do | | 72.7 | 20.2 |
| 3 | SF-1 | Test | Triton GR-7 | 78.9 | 4.2 |
| 4 | SF-4 | Control | | 78.8 | 23.4 |
| 5 | SF-4 | do | | 80.6 | 23.0 |
| 6 | SF-4 | Test | NI-O | 80.6 | 18.0 |
| 7 | SF-7 | Control | | 77.2 | 24.0 |
| 8 | SF-7 | do | | 78.1 | 23.1 |
| 9 | SF-7 | Test | Alkanol OA | 75.4 | 15.5 |
| 10 | SF-6 | Control | | 80.6 | 22.8 |
| 11 | SF-6 | do | | 81.0 | 25.0 |
| 12 | SF-6 | Test | Zonyl A | 79.2 | (2) |
| 13 | SF-9 | Control | | 75.2 | 24.8 |
| 14 | SF-9 | do | | 75.4 | 24.8 |
| 15 | SF-9 | Test | RM-455 | 75.4 | 3.1 |

[1] Commercial grade heptane.
[2] Emulsion unable to obtain recovery data.

Example II

Torpedo sandstone cores were cleaned and dried, and the pore volume measured by the gas expansion method. The saturation procedure consisted of evacuating the core, injecting carbon dioxide, saturating with 100,000 p.p.m. brine under pressure, and then flooding with Klearol mineral oil until an irreducible water saturation was obtained. A butane flood was conducted to displace the Klearol mineral oil from cores. Then an LPG surfactant flood was conducted until the analyses of the produced fluids indicated that surfactant concentration in the effluent was equal to the injected surfactant concentration. Analyses of the propane-butane mixtures were performed with a Perkin-Elmer gas chromatograph. Surfactant concentrations were measured with a Beckman DU spectrophotometer.

The chromatographic transport rates found for various concentrations of surfactant are set forth in Table III.

TABLE III

| Surfactant | Concentration, percent | Transport rate, percent |
|---|---|---|
| GR-7 | 1 | 57 |
| GR-7 | 5 | 88 |
| GR-7 | 0.1 | (1) |
| RM-455 | 0.01 | 68 |
| RM-455 | 0.1 | 94 |
| RM-455 | 1.0 | 95 |

[1] None produced after injecting 2.6 p.v. of LPG (extrapolation of data indicates about 10% expected).

The chromatographic transport rate of a surfactant is the result of the surfactant being depleted from the LPG by adsorption on the reservoir rock pore surfaces and being held up in the reservoir fluids. The loss of the active agent of Triton GR–7, determined from the chromatographic transport rate data, was $911 \times 10^{-6}$ pound per pound of sand. The amount of the adsorption can be fully realized when one considers that an acre-ft. of this rock will weigh $4.76 \times 10^6$ pounds; thus 4336 pounds of the active agents would be lost to every acre-ft. of the reservoir rock. The loss of the active agent of RM–455 from the LPG flood was calculated to be $4 \times 10^{-6}$ pound of surfactant per pound of sand and for an acre-ft. of reservoir rock, 19 pounds of active agent.

Example III

To illustrate the improved water injectivity of this invention, when using a sandstone core saturated with heptane, the waterflood residual of heptane of 33–34% p.v. was reduced to 13% p.v. and 4% p.v. by introducing GAF RM–455 into the heptane at concentrations of 0.1% to 1.0% by weight, respectively. The relative permeability to water at a heptane saturation of 33% p.v. was 11.9 md. and 59.4 md. at a 4% heptane saturation. This means that a permeability increase of 5-fold was obtained by introducing GAF RM–455 into heptane at a 1.0% by weight concentration. The relative permeability to water at a heptane saturation of 34% p.v. was 10.5 md. and 33.5 md. at a 13% p.v. heptane saturation. A permeability increase of 3-fold was obtained by introducing GAF RM–455 into heptane at 0.1% by weight concentration.

The following table illustrates the effect of improved permeability zones on water injectivity in a petroleum bearing reservoir in a 40-acre 5-spot pattern having a central injection well and four surrounding production wells when using a small slug of LPG containing GAF RM–455. For comparison, the permeability increase in the linear heptane system described above is included in Table IV. A pressure sufficient to keep the LPG liquid is maintained on the reservoir.

TABLE IV

| RM-455 concent. in heptane, wt. percent | Perm. increase in linear sys., percent | Radial 40-acre 5-spot pattern | | | |
|---|---|---|---|---|---|
| | | LPG slug size, percent P.V. | RM-455 conc., wt. percent | Radius of zone of imprvd. perm. in ft. | Inject. after improvement/inject. before improvement |
| 1 | 500 | 0.4 | 1 | 40 | 1.95 |
| 1 | 500 | 0.1 | 1 | 20 | 1.70 |
| 0.1 | 300 | 0.4 | 0.1 | 40 | 1.70 |
| 0.1 | 300 | 0.1 | 0.1 | 20 | 1.55 |

These results indicate that the injectivity increase of 1.55 to 1.95 fold is obtained by this method using GAF RM–455 in LPG. This increase in injectivity can be interpreted as the decrease in the life of the water-flood operation, thereby decreasing the operating costs.

Example IV

The nonyl phenoxy polyethyleneoxy phosphate diester sodium and barium salts (mole ratios, i.e., n equal 4 and 9), the nonoyl phenoxy polyethyleneoxy (mole ratios 4, 6 and 9) phosphate monoester potassium salts and barium salts are used in Example I in place of GAF–RM–455.

It is claimed:
1. In a method for the secondary recovery of crude oil from an underground reservoir containing the same utilizing an input well and an output well comprising injecting a hydrocarbon solvent containing about 0.001 to 5% of a surface active agent into said reservoir in an amount sufficient to produce a slug thereof for driving said oil toward said output well, said solvent having a viscosity not significantly exceeding that of the oil in place in said reservoir, subsequently injecting water into said reservoir to drive said slug of solvent toward said output well, and recovering the driven oil at said output well, the improvement wherein said surface active agent is selected from the group consisting of the oil soluble, substantially water insoluble alkyl and aralkyl polyoxyethylene phosphate ester and diester acids of the type R—OPO$_3$H$_2$ and (R—O)$_2$PO$_2$H and ammonium, alkali metal and barium salts thereof, R being selected from the group consisting of alkyl radicals of from about 8 to 27 carbon atoms and alkylphenyl radicals, the alkyl substituent of which is of 5 to 27 carbon atoms, modified with ethylene oxide in a mole ratio of about 1:1 to 40:1.

2. The method of claim 1 wherein said slug is less than about 50% of the pore volume of said reservoir.

3. The method of claim 1 wherein said solvent contains from about 0.01 to 1% by weight surface active agent.

4. The method of claim 1 wherein said solvent is a low molecular weight liquid hydrocarbon.

5. The method of claim 4 wherein said light hydrocarbon is LPG.

6. The method of claim 4 wherein said light hydrocarbon is heptane.

7. The method of claim 1 wherein said surfactant is the barium salt of an aralkyl polyethyleneoxy phosphate ester acid.

8. The method of claim 1 wherein the surface active agent is characterized by the formula:

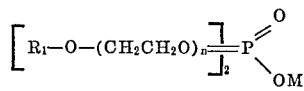

where R$_1$ is alkyl of about 8 to 27 carbon atoms, n represents the degree of oxyethylenation ranging from about 1 to 40 and M is selected from the group consisting of hydrogen, ammonium, barium and alkali metal.

9. The method of claim 1 wherein the surface active agent is characterized by the formula:

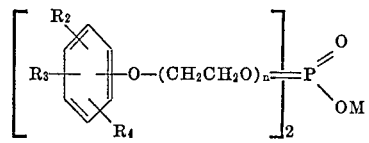

where R$_2$, R$_3$ and R$_4$ are selected from the group consisting of hydrogen and alkyl of up to about 27 carbon atoms, with the proviso that at least one of R$_2$, R$_3$ and R$_4$ is alkyl of about 5 to 27 carbon atoms, n represents the degree of ethylenation ranging from about 1 to 40 and M is selected from the group consisting of hydrogen, ammonium, barium and alkali metal.

10. The method of claim 1 wherein the surface active agent is characterized by the formula:

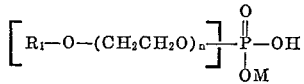

where R$_1$ is alkyl of about 8 to 27 carbon atoms, n represents the degree of oxyethylenation ranging from about 1 to 40 and M is selected from the group consisting of hydrogen, ammonium, barium and alkali metal.

11. The method of claim 1 wherein the surface active agent is characterized by the formula:

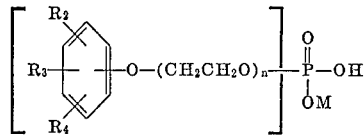

where R$_2$, R$_3$ and R$_4$ are selected from the group consisting of hydrogen and alkyl of up to about 27 carbon atoms, with the proviso that at least one of R$_2$, R$_3$ and R$_4$ is alkyl of about 5 to 27 carbon atoms, n represents the degree of ethylenation ranging from about 1 to 40 and M is selected from the group consisting of hydrogen, ammonium, barium and alkali metal.

12. The method of claim 1 wherein the water drives the solvent to the output well and including recovering the solvent at the output well.

13. In a water flood system for the secondary recovery of crude oil from an underground formation containing the same, the improvement of a method for improving the water injectivity of the system comprising injecting into said formation from an input well area an amount of a hydrocarbon solvent sufficient to produce a slug thereof in the reservoir less than 0.45% pore volume in size, said solvent containing about 0.001 to 5% of a normally liquid, oil soluble, surface active agent selected from the group consisting of alkyl and aralkyl polyoxyethylene phosphate ester and diester acids of the type R—OPO$_3$H$_2$ and (R—O)$_2$PO$_2$H and ammonium, alkali metal and barium salts thereof, R being selected from the group consisting of alkyl radicals of from about 8 to 27 carbon atoms and alkylphenyl radicals, the alkyl substituent of which is of 5 to 27 carbon atoms, modified with ethylene oxide in a mole ratio of about 1:1 to 40:1, and subsequently injecting into the formation an aqueous medium to drive said hydrocarbon towards an output well, and recovering said crude oil from the output well.

14. The method of claim 13 wherein said solvent is an alkane.

15. The method of claim 14 wherein the solvent is LPG.

16. The method of claim 15 wherein the surface active agent is characterized by the formula:

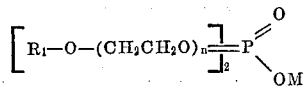

where R$_1$ is alkyl of about 8 to 27 carbon atoms, $n$ represents the degree of oxyethylenation ranging from about 1 to 40 and M is selected from the group consisting of hydrogen, ammonium, barium, and alkali metal.

17. The method of claim 16 wherein the surface active agent is characterized by the formula:

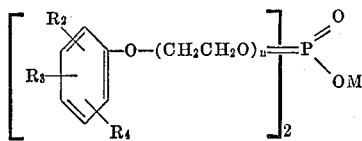

where R$_2$, R$_3$ and R$_4$ are selected from the group consisting of hydrogen and alkyl of up to about 27 carbon atoms, with the proviso that at least one of R$_2$, R$_3$ and R$_4$ is alkyl of about 5 to 27 carbon atoms, $n$ represents the degree of ethylenation ranging from about 1 to 40 and M is selected from the group consisting of hydrogen, ammonium, barium and alkali metal.

18. The method of claim 15 wherein the surface active agent is characterized by the formula:

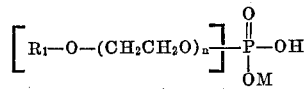

where R$_1$ is alkyl of about 8 to 27 carbon atoms, $n$ represents the degree of oxyethylenation ranging from about 1 to 40 and M is selected from the group consisting of hydrogen, ammonium, barium, and alkali metal.

19. The method of claim 16 wherein the surface active agent is characterized by the formula:

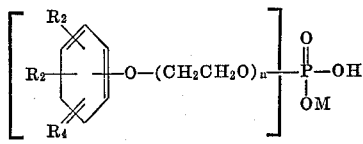

where R$_2$, R$_3$ and R$_4$ are selected from the group consisting of hydrogen and alkyl of up to about 27 carbon atoms, with the proviso that at least one of R$_2$, R$_3$ and R$_4$ is alkyl of about 5 to 27 carbon atoms, $n$ represents the degree of ethylenation ranging from about 1 to 40 and M is selected from the group consisting of hydrogen, ammonium, barium and alkali metal.

References Cited

UNITED STATES PATENTS

| | | | |
|---|---|---|---|
| 3,004,056 | 10/1961 | Nunn et al. | 252—89 X |
| 3,082,822 | 3/1963 | Holm et al. | 166—9 |
| 3,212,575 | 10/1965 | Fisher et al. | 166—9 |
| 3,246,694 | 4/1966 | Taber et al. | 166—9 |
| 3,330,346 | 7/1967 | Jacobs et al. | 166—9 |

JAMES A. LEPPINK, *Primary Examiner.*

IAN A. CALVERT, *Assistant Examiner.*

U.S. Cl. X.R.

252—89

UNITED STATES PATENT OFFICE
CERTIFICATE OF CORRECTION

Patent No. 3,435,898  Dated April 1, 1969

Inventor(s) James L. Thompson

It is certified that error appears in the above-identified patent and that said Letters Patent are hereby corrected as shown below:

Column 8, in claim 19, that portion of the formula reading:

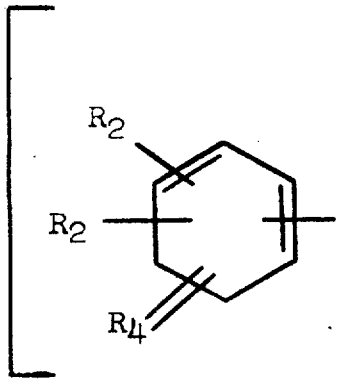 should be 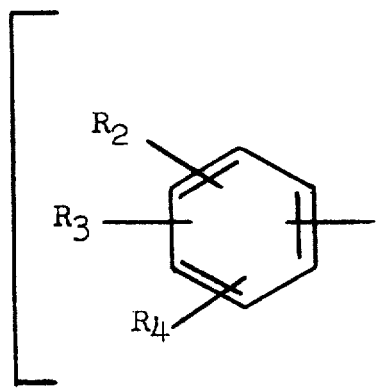

SIGNED AND SEALED

MAR 3 - 1970

(SEAL)
Attest:

Edward M. Fletcher, Jr.
Attesting Officer

WILLIAM E. SCHUYLER, JR
Commissioner of Patents